United States Patent
Wallace et al.

(10) Patent No.: US 11,522,780 B1
(45) Date of Patent: Dec. 6, 2022

(54) MONITORING NETWORKS BY DETECTION OF NOISY AGENTS

(71) Applicant: Amazon Technologies, Inc., Seattle, WA (US)

(72) Inventors: Ronan James Wallace, Dublin (IE); Edin Kozo Becirevic, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,226

(22) Filed: Dec. 10, 2020

(51) Int. Cl.
| | |
|---|---|
| *H04L 43/12* | (2022.01) |
| *H04L 43/04* | (2022.01) |
| *H04L 43/062* | (2022.01) |
| *H04L 43/0852* | (2022.01) |
| *H04L 43/0823* | (2022.01) |
| *H04L 43/0876* | (2022.01) |
| *H04L 43/50* | (2022.01) |
| *H04L 43/0817* | (2022.01) |

(52) U.S. Cl.
CPC .............. *H04L 43/12* (2013.01); *H04L 43/04* (2013.01); *H04L 43/062* (2013.01); *H04L 43/0817* (2013.01); *H04L 43/0823* (2013.01); *H04L 43/0852* (2013.01); *H04L 43/0876* (2013.01); *H04L 43/50* (2013.01)

(58) Field of Classification Search
CPC ....... H04L 43/12; H04L 43/04; H04L 43/062; H04L 43/0817; H04L 43/0823; H04L 43/0852; H04L 43/0876; H04L 43/50
See application file for complete search history.

(56) References Cited

U.S. PATENT DOCUMENTS

| | | | | |
|---|---|---|---|---|
| 6,457,143 | B1* | 9/2002 | Yue ..................... | H04L 41/5003 709/223 |
| 8,266,703 | B1* | 9/2012 | Magdych ............ | H04L 63/1433 726/25 |
| 8,990,639 | B1* | 3/2015 | Marr ................... | G06F 11/3672 714/25 |
| 10,797,984 | B1* | 10/2020 | Sardaryan ............... | H04L 69/22 |
| 2015/0023203 | A1* | 1/2015 | Odell .................. | H04L 43/0852 370/253 |
| 2019/0182141 | A1* | 6/2019 | Shih .................... | H04L 43/0852 |
| 2020/0099603 | A1* | 3/2020 | Gupta .................... | H04L 45/70 |

\* cited by examiner

*Primary Examiner* — Joseph L Greene
(74) *Attorney, Agent, or Firm* — Klarquist Sparkman, LLP (57) ABSTRACT

Usually agents probe other agents across the network to determine health of a network. However, it is also useful for agents to probe themselves. Such a test probe is off-network in that it does not leave a server rack. The off-network probes can be used to detect noisy agents, which can be excluded from further consideration in evaluating overall network quality. The off-network probing of the agents can be done in a loopback interface of the host device or via a top-of-rack switch to another distinct agent in the rack.

10 Claims, 8 Drawing Sheets

MONITORING NETWORKS BY DETECTION OF NOISY AGENTS

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Latency and packet loss are important metrics for testing of a network. Network operations and engineering teams use latency and packet loss determinations to identify and fix network performance problems. The latency experienced between a network source and a network destination is determined by the sum of link propagation latencies for the links on the network path between them, and the sum of the switching and queuing latencies at each router hop that interconnects those links. Networks are dynamic and as changes are made to the network topology and configuration, either by design or by failure, the paths used between a source and a destination can change. As traffic loads change, the queuing latencies at each hop change. As a result, it can be difficult to know what the expected network latencies should be between any source/destination pair. Packet loss occurs when a packet transmitted from a source host server computer is not reached by a destination computer. Packet loss can occur for multiple reasons, such as dropped packets due to an overloaded buffer on a network switch.

DETAILED DESCRIPTION

Active Monitoring (AM) of cloud networks helps ensure successful operation of the networks. Telemetry gathered by the AM agents are used by network operations and engineering teams to identify and fix network performance problems. The AM agents are typically located in every host attached to the network and often share computing resources with other systems and services that run on the host. If the host is being intensively utilized by those other systems, the AM agent may not get the resources it requires to perform active monitoring. This impacts the data that the AM agent collects, such as packet loss and latency, and, additionally, the telemetry the AM agent sends to a centralized controller of a distributed system. Such a problem with the AM agent increases the packet loss and/or latency statistics, which are interpreted as being degraded network performance. Agents whose data has been affected in this way are said to be noisy, as are the data samples produced by them.

Usually agents probe other agents across the network to determine the network health. However, it is also useful for agents to probe themselves. Such a test probe is off-network in that it does not leave a server rack. If the off-network probe statistics degrade in performance then it is due to noisy agents. This agent may be excluded from further consideration, thereby improving the quality of the AM dataset. Typically, the timelines of the AM and external system are aligned, or the data point granularity is not compatible. For instance, the AM system could be producing data at a 30-second frequency whereas the external source of host health might be producing data at a 10-minute frequency. The proposed approach has the advantage that the timelines of the AM and external sources do not need to be reconciled since only the AM timeline is used. The off-network probing of the monitoring agents can be done in a loopback interface of the host device or via a top-of-rack switch to another distinct agent in the rack.

Figure 1:
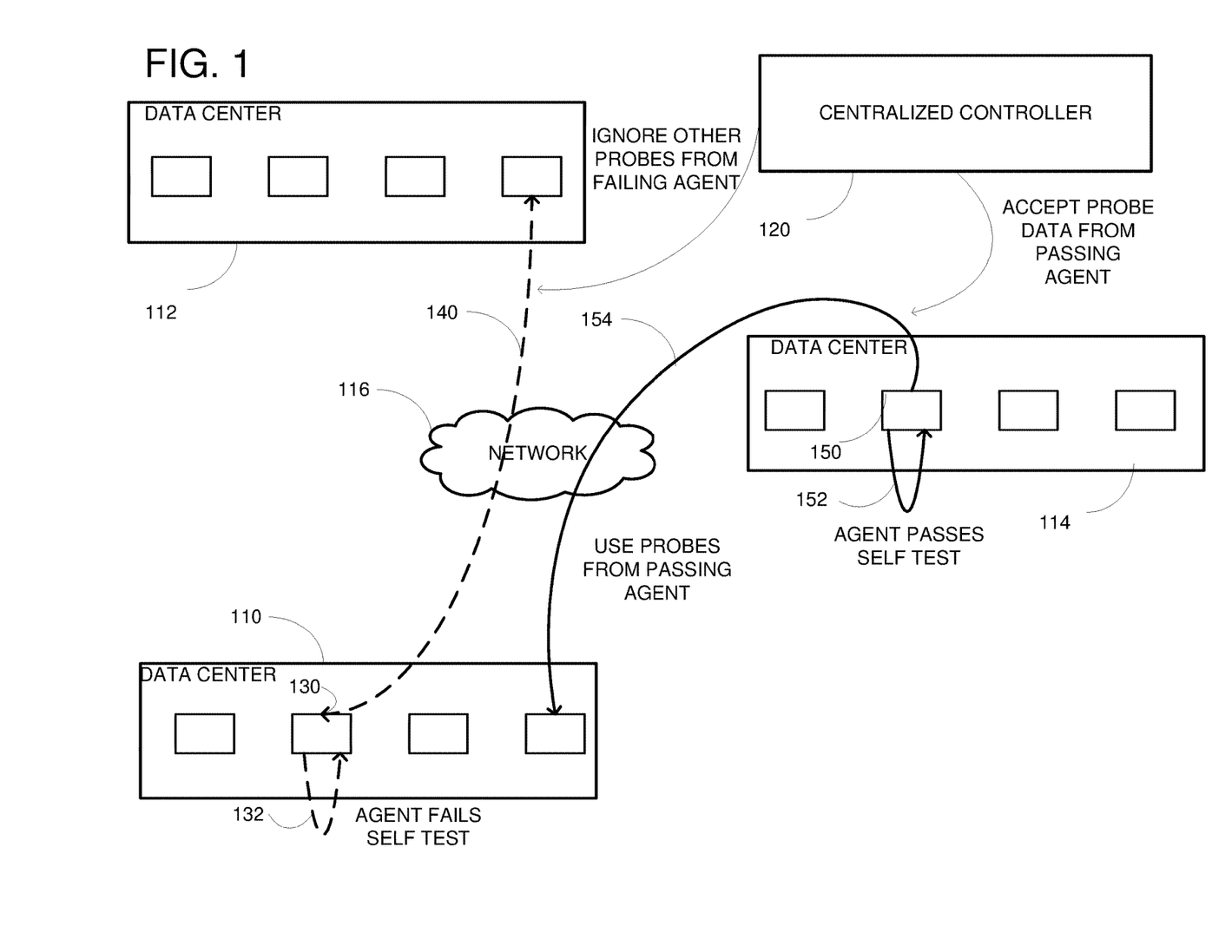
FIG. 1 illustrates a system in which noisy agents are detected and ignored in evaluating network issues by a centralized controller.

FIG. 1 is a system diagram for detecting noisy agents and modifying active monitoring calculations in response to such a detection. A distributed system 100 includes multiple data centers 110, 112, 114 coupled together by a network 116 being monitored by a centralized controller 120. The data centers 110, 112, 114 can be in a same region, different geographic regions or different availability zones. An agent on a server computer 130 performs a self-test, as shown at 132, by transmitting a test probe to itself. Such a test probe can have a source address and a destination address that are the same IP address. As further described below, the test probe can pass through an egress buffer and an ingress buffer in a kernel of the server computer. If the kernel buffers are overloaded with network traffic, the latency for the test probe can exceed predetermined limits. Alternatively, the test probe can be dropped if the buffers are full. In any event, the agent executing on the server computer 130 can fail the self-test. In such a case, the agent can transmit an alert to the centralized controller 120 indicating that test probes emanating from the server computer 130 can be faulty. For example, a test probe indicated at 140 can have latency issues associated with the server computer 130 itself, as opposed to latency issues due to the network 116. The test probe 140 can be from data center 110 to the data center 112 and then back to data center 110 in a round trip. The centralized controller 120 can ignore any test probes associated with the server computer 130, as indicated by the dashed line of the test probe 140. For example, latency data and dropped packet data can be ignored. By contrast, an agent executing on a server computer 150 in data center 114 can pass its own self-test shown at 152. As a result, a test probe 154 can be used by the centralized controller 120 in assessing latency and packet drop data of the network 116. Thus, the centralized controller 120 can receive information from agents, such as agents executing on server computers 130, 150, related to whether the agents are noisy or not. Such a determination is made by the agents themselves by performing a self-test wherein an agent transmits a packet to itself and a determination is made regarding latency and packet loss without the test packets passing through the network 116. In this way, a better assessment can be made for test probes that traverse the network 116. In an additional aspect, the centralized controller 120 can adjust latency determinations as opposed to ignoring the test probes. For example, a latency determination of test probe 140 can have the latency of test probe 132 subtracted from it to adjust the overall latency based on the noisy agent. In some cases, the agent can adjust latency. For example, if the agent in server computer 130 determines latency using test probe 132, then probe 140 (which can be a round-trip probe) can have its latency adjusted by the agent. The resultant latency-adjusted data can then be transmitted to the centralized controller 120.

Figure 2:
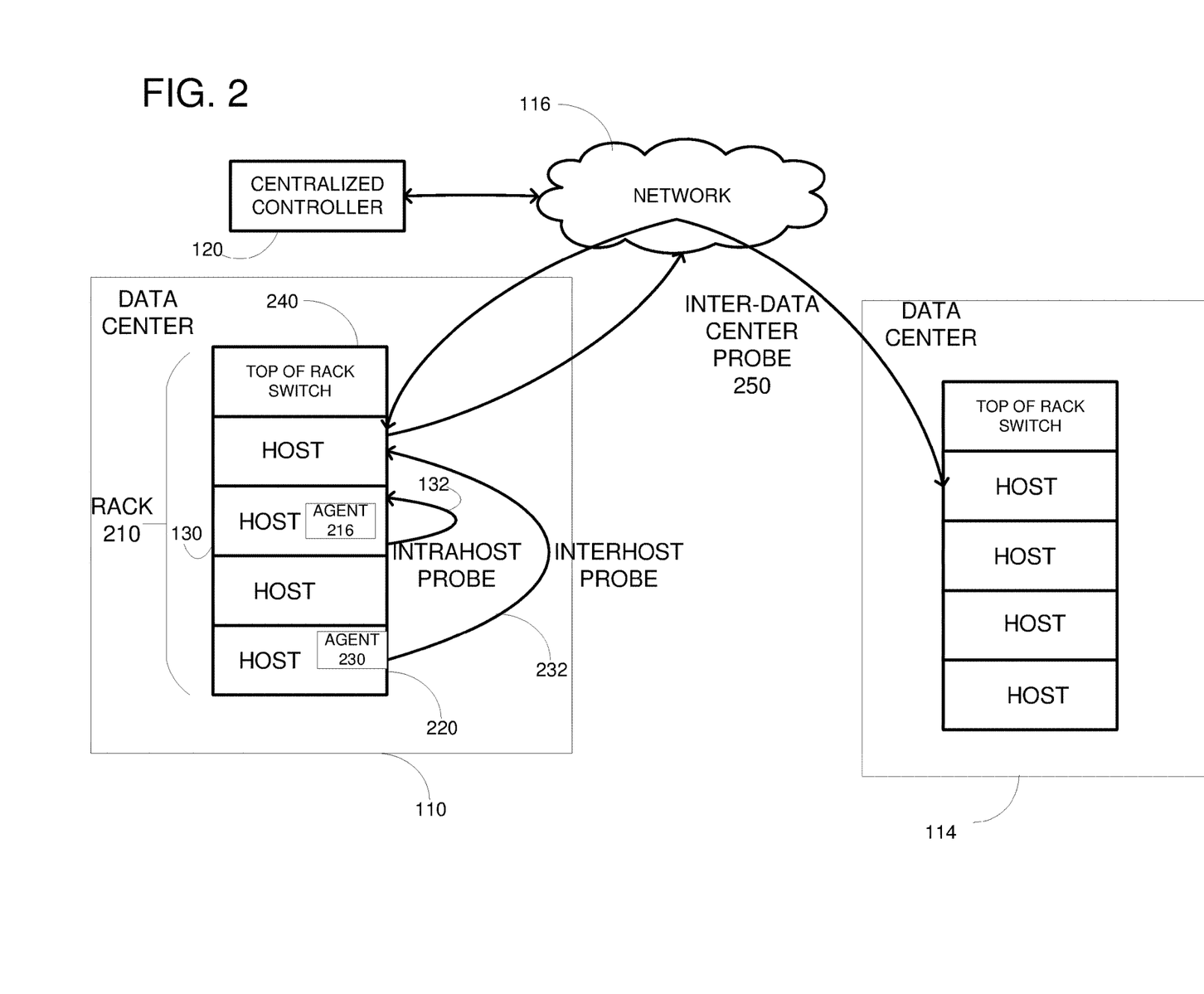
FIG. 2 shows a system wherein a server rack is tested for noisy agents.

FIG. 2 is a system diagram illustrating the server computers that are hosting agents can be positioned within a server rack 210. The data center 110 includes the server computer 130 with an agent 216 executing thereon that performs the self-test 132, as previously described in relation to FIG. 1. In this case, the host server computer 130 is positioned within the rack 210 with other host server computers, such as host server computer 220. An agent 230 executing on host server computer 220 can transmit an interhost probe 232 in order to test latency and packet drops within the server rack 210 without transmission of the packets over the network 116. Although not shown, such transmissions of packets between different server computers within the rack 210 may require to traverse a top-of-rack switch 240. Although only one interhost probe 232 is shown, there can be multiple interhost probes between the host server computers in the rack 210. For example, each host server computer in the rack can send a test probe to each other host server computer in the rack 210. If there are latency and/or packet drops on all or a majority of the host server computers in the rack 210, then the top-of-rack switch 240 is likely problematic. Data regarding latency and packet drops can be transmitted from the server computers within the rack 210 to the centralized controller 120 via the network 116. The centralized controller 120 can receive the data and interpret the data to determine which host server computer in the rack is problematic or whether the switch 240 is problematic. The host server computers within the rack 210 can also transmit test probes to host server computers in other data centers, such as is shown by test probe 250 transmitted from data center 110 to data center 114. If the test probes testing the rack 210 fail, such as probes 132 or 232, then the centralized controller 120 can be alerted to ignore results coming from the rack 210, such as the results of the test probe 250. Otherwise, if the test probes 132, 232 pass, then the centralized controller 120 can use the results (e.g., latency) of the probe 250.

Figure 3:
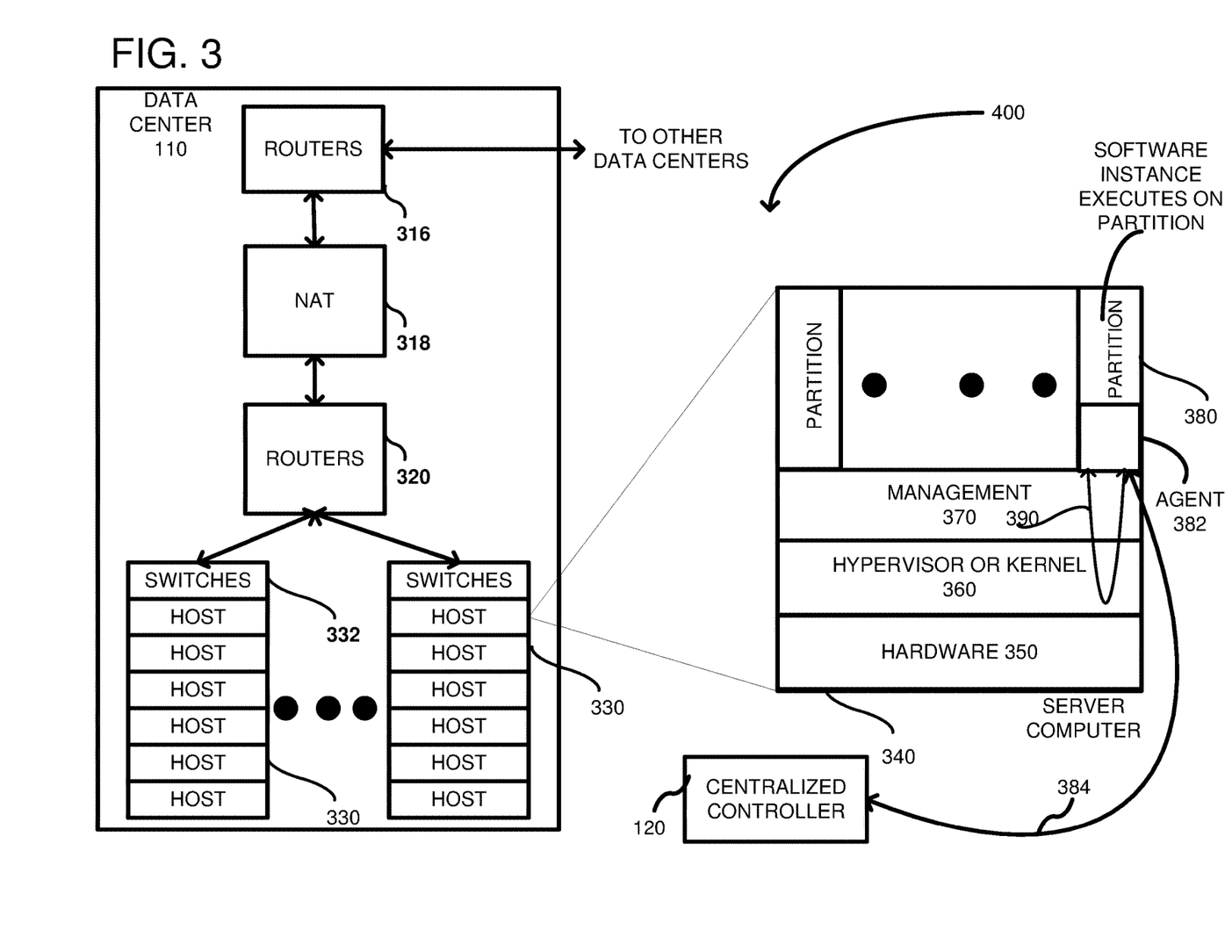
FIG. 3 shows an example of a plurality of host computers, routers and switches, with an agent running on a virtual machine instance.

FIG. 3 illustrates further details of the data center 110, which is coupled to other data centers by routers 316. The routers 316 read address information in a received packet and determine the packet's destination. If the router decides that a different data center contains a host server computer, then the packet is forwarded to that data center. If the packet is addressed to a host in the data center 110, then it is passed to a network address translator (NAT) 318 that converts the packet's public IP address to a private IP address. The NAT also translates private addresses to public addresses that are bound outside of the datacenter 110. Additional routers 320 can be coupled to the NAT to route packets to one or more racks of host server computers 330. Each rack 330 can include a switch 332 coupled to multiple host server computers. A particular host server computer is shown in an expanded view at 340.

Each host 340 has underlying hardware 350 including one or more CPUs, memory, storage devices, etc. Running a layer above the hardware 350 is a hypervisor or kernel layer 360. The hypervisor or kernel layer can be classified as a type 1 or type 2 hypervisor. A type 1 hypervisor runs directly on the host hardware 350 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 370 can be part of the hypervisor or separated therefrom and generally includes device drivers needed for accessing the hardware 350. The partitions 380 are logical units of isolation by the hypervisor. Each partition 380 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 370, which can then pass the metrics to the centralized controller 120. Additionally, the management layer 370 can pass to the centralized controller 120, the number of instances that are running, when they were launched, the operating system being used, the applications being run, when packets are received or transmitted (latency information), etc. All such metrics can be used for consumption by the centralized controller 120 and stored in a database. Additionally, an agent 382 can execute on one of the partitions 380 and transmit latency and packet loss information to the centralized controller 120, as shown at 384. For example, test packets can be transmitted through the network and when received by the agent 382, the agent transmits the packet identifier and a timestamp of when the packet was received to the centralized controller 120. Additionally, the centralized controller 120 can inject packets into the network by passing packets to the agent 382, which can, in turn, re-transmit the packet through the network. As shown at 390, the agent 382 can perform a self-test that reaches into the hypervisor or kernel layer 360 but does not reach the NIC within the hardware layer 350. Such a self-test allows the agent 382 determine whether it is a noisy agent. Although not shown, the agent 382 can also be positioned within the hypervisor or kernel layer 360 or within the hardware 350.

Figure 4:
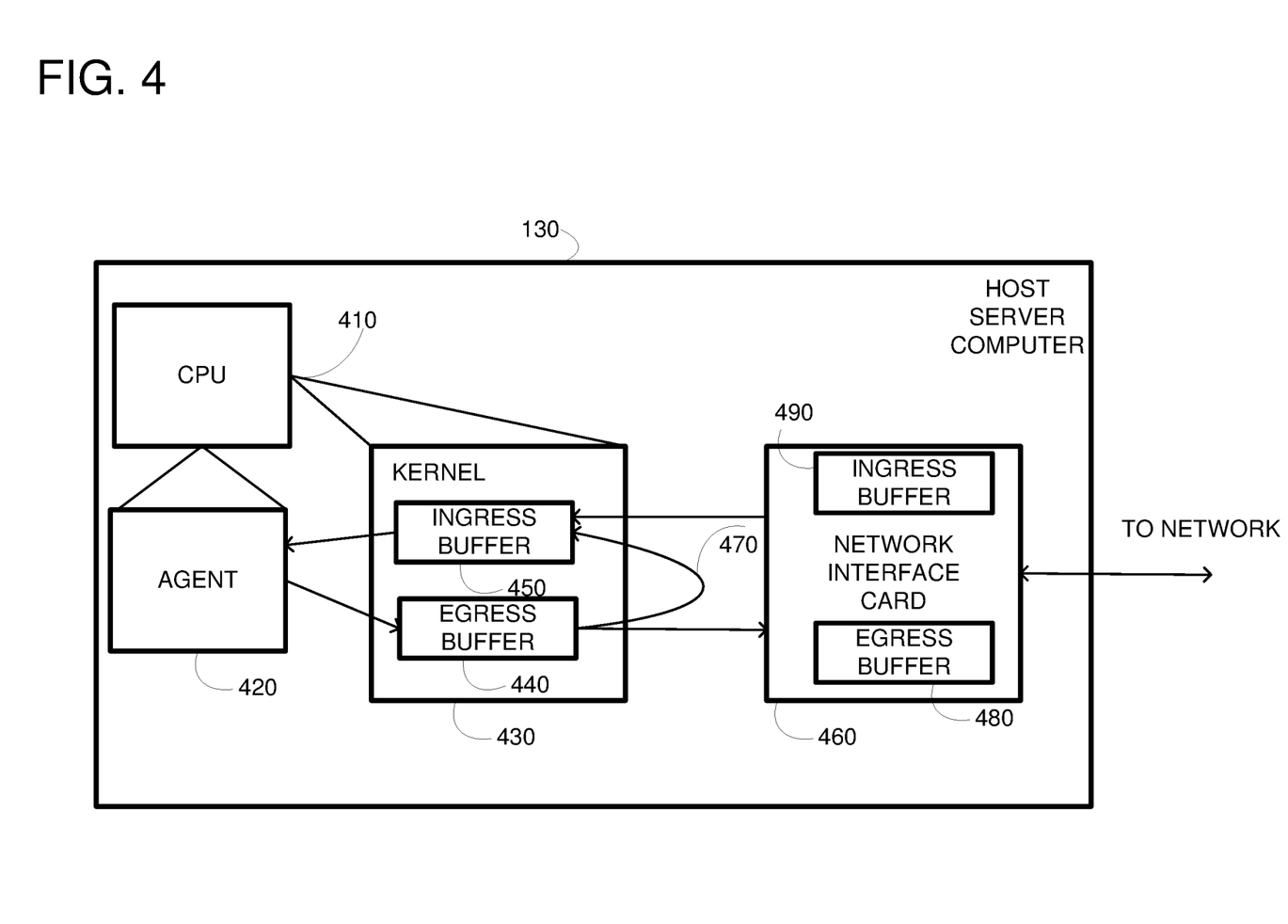
FIG. 4 shows an example of an agent testing itself using kernel buffers.

FIG. 4 is an example embodiment of the host server computer 130. The host server computer 130 includes a CPU 410 upon which an agent application 420 is executed. Additionally, a kernel 430 executes on the CPU 410 and the kernel includes egress buffer 440 and an ingress buffer 450. Packets in the egress buffer having a destination outside of the host server computer 130 are passed to a network interface card 460 (NIC) for transmission over the network. Additionally, packets from the NIC are passed to the ingress buffer 450 and delivered to the application having the appropriate address designated by the packet. The arrow at 470 illustrates that the agent 420 can transmit a packet that designates the agent 420 as both the source and destination IP address. As a result, the packet passes from the egress buffer 440 to the ingress buffer 450 without being transmitted to the NIC 460. Thus, the agent 420 tests latency of the buffers within the kernel 430. If at least one of the buffers 440, 450 is overloaded, then the agent can fail the transmitted test packet. Failure of a test packet without the test packet making it to the network indicates that the agent is noisy and should be excluded from participating in tests. Alternatively, the resultant latency can be computed and subtracted from any later calculated network latency determination. For interhost test probes, an egress buffer 480 and an ingress buffer 490 on the NIC 460 can be tested, in addition to the egress buffer 440 and ingress buffer 450 in the kernel.

Figure 5:
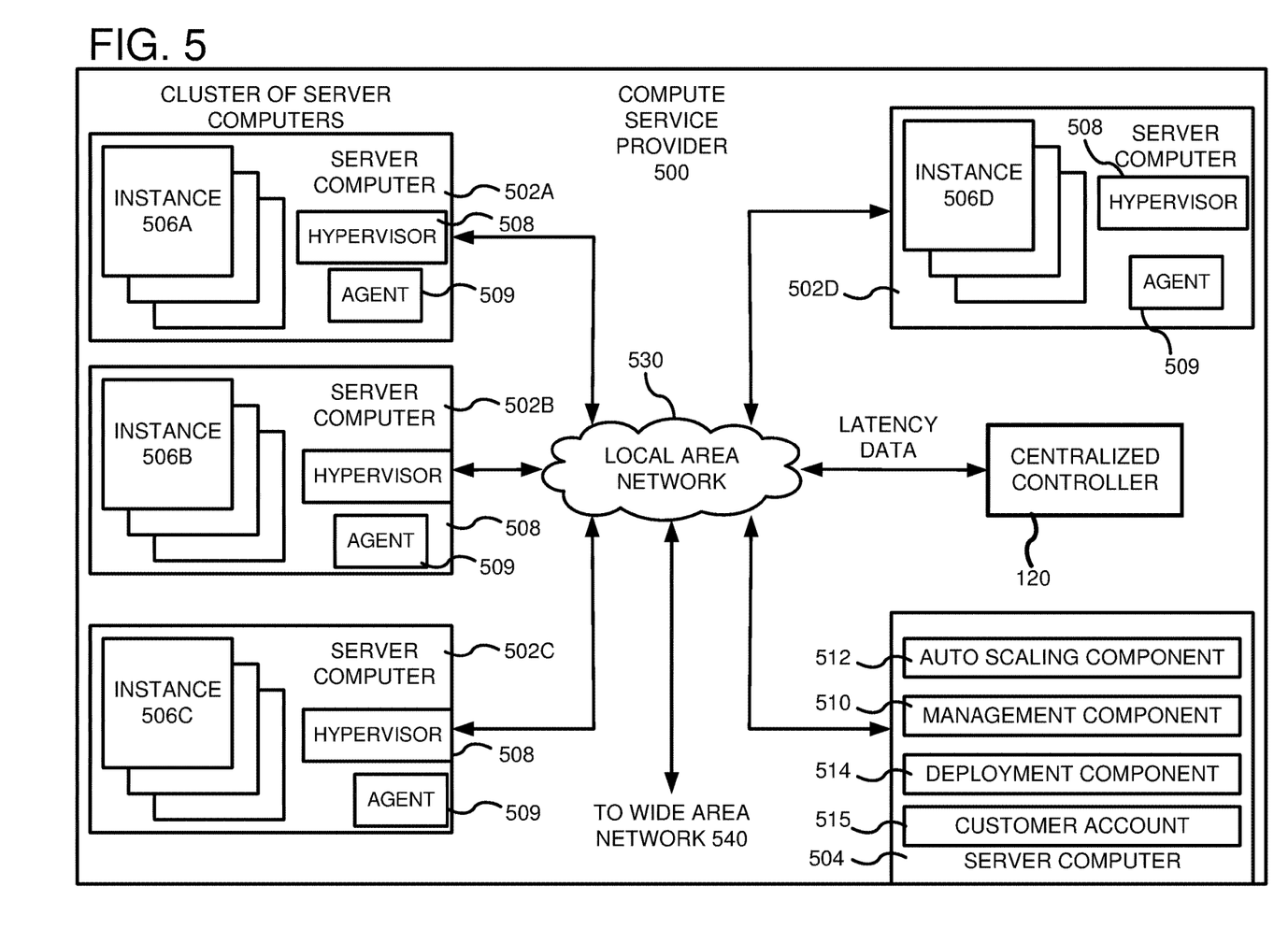
FIG. 5 is an example system diagram showing a plurality of virtual machine instances running in the multi-tenant environment with a centralized controller executing in the multi-tenant environment in order to monitor network activity.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. A particular application that can execute on one or more instances 506 or run on the hypervisor, is an agent 509. The agent 509 can receive test packets and transmit latency information to the centralized controller 120. The latency information can include a packet identifier as well as timing information so that latency of each packet can be determined by the centralized controller 120. The agent 509 can also transmit packets for receipt by other agents on the network in order to assist the centralized controller in latency determinations. In one embodiment, the agent 509 can transmit a test packet upon request from the centralized controller 120 and report back to the centralized controller a time that the packet was transmitted together with an identifier of the packet. The agent 509 can also perform a self-test by transmitting test packets having a same source and destination IP address. Such test packets can pass through the buffers of the hypervisor 508 before being received back by the agent 509. If an amount of time exceeds a predetermined threshold, then the agent 509 can report a self-test failure to the centralized controller 120. Similar functionality can be performed for dropped test packets.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Figure 6:
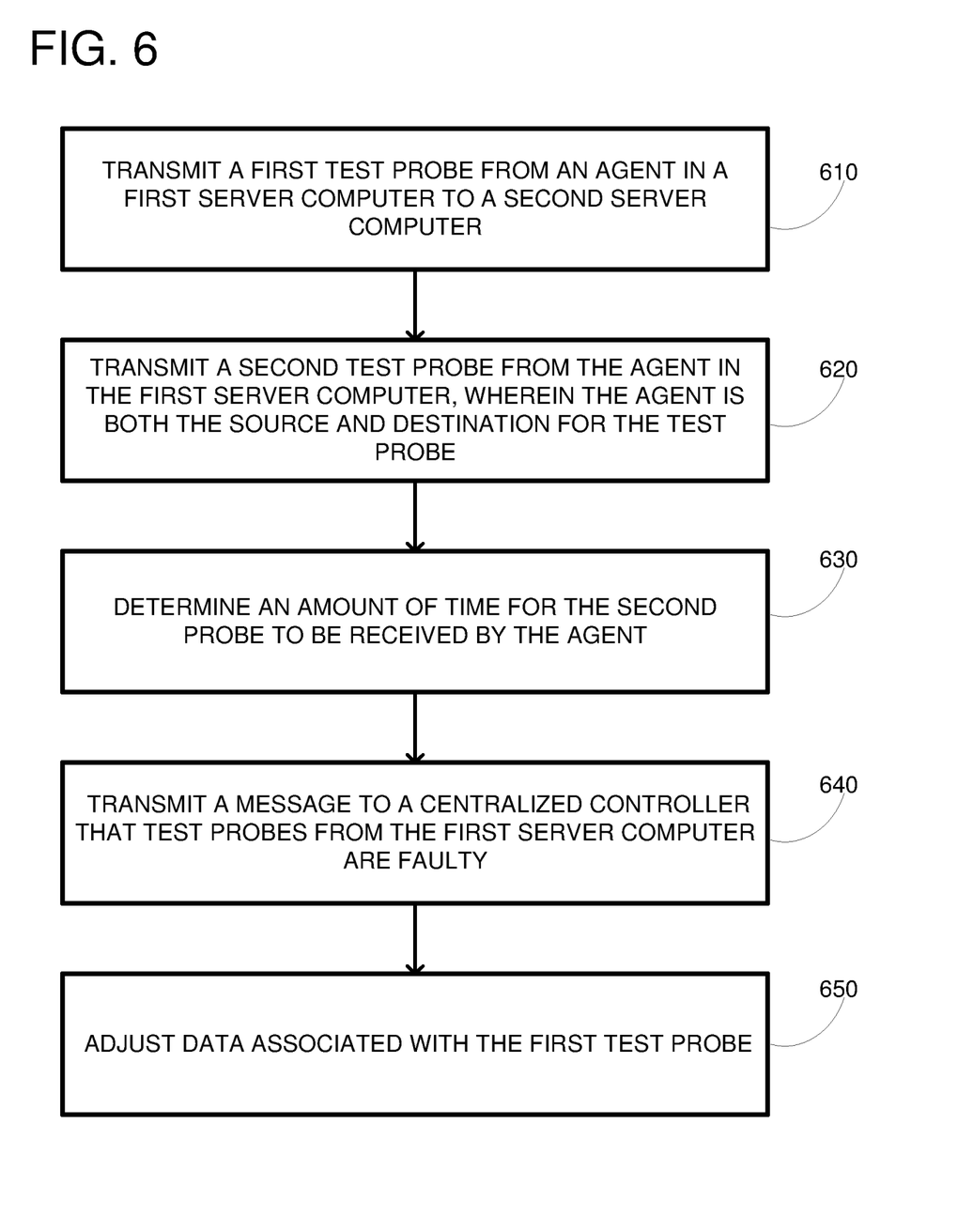
FIG. 6 is a flowchart according to one embodiment of a method for detecting noisy agents

FIG. 6 is a flowchart for testing a network. In process block 610, a first test probe is transmitted from an agent in a first server computer to a second server computer. For example, in FIG. 1 a test probe 140 is transmitted from a server computer 130 to a server computer in the data center 112. Depending on the implementation, the test probe 140 can be a one-way probe or perform a round-trip, returning to server computer 130, wherein latency is determined based upon the round-trip time by either the agent or a centralized controller. In process block 620, a second test probe is transmitted from the agent, wherein the test probe has a same source and destination, which is the agent itself. For example, in FIG. 1, the agent 130 transmits the test probe 132 to itself. FIG. 4 illustrates that the probe can pass through egress and ingress buffers in the kernel of the server computer. In process block 630, the agent can determine an amount of time for the second probe to be received back by the agent. For example, the test probe 132 can be given a time stamp indicating a time of transmission, and when received back by the agent, a second time stamp can be used. A difference between the two time stamps is the latency of the test probe in being transmitted through the egress and ingress buffers. In process block 640, a message is transmitted to a centralized controller that test probes from the first server computer are faulty. The agent can determine that the test probe failed a test by comparing whether the amount of time exceeds a threshold. Alternatively, the centralized controller can be provided the information and it can make such a determination if the test probe failed the test. The threshold can be a predetermined amount of time or dynamically calculated, such as based upon network events. For example, in FIG. 1, the agent 130 can transmit a message via network 116 to the centralized controller 120 that the agent 130 failed the self-test. Additionally, in some embodiments, the internal latency value can also be transmitted to the centralized controller 120. In process block 650, the centralized controller or the agent can adjust data associated with the first probe. For example, data received in the centralized controller 120 relating to test probe 140 can be adjusted, such as by discarding the data altogether or modifying any latency determination to account for latency delays in the server 130, which were identified by the self-test. For example, the latency delay of the self-test can be subtracted from the latency delays of probe 140.

Figure 7:
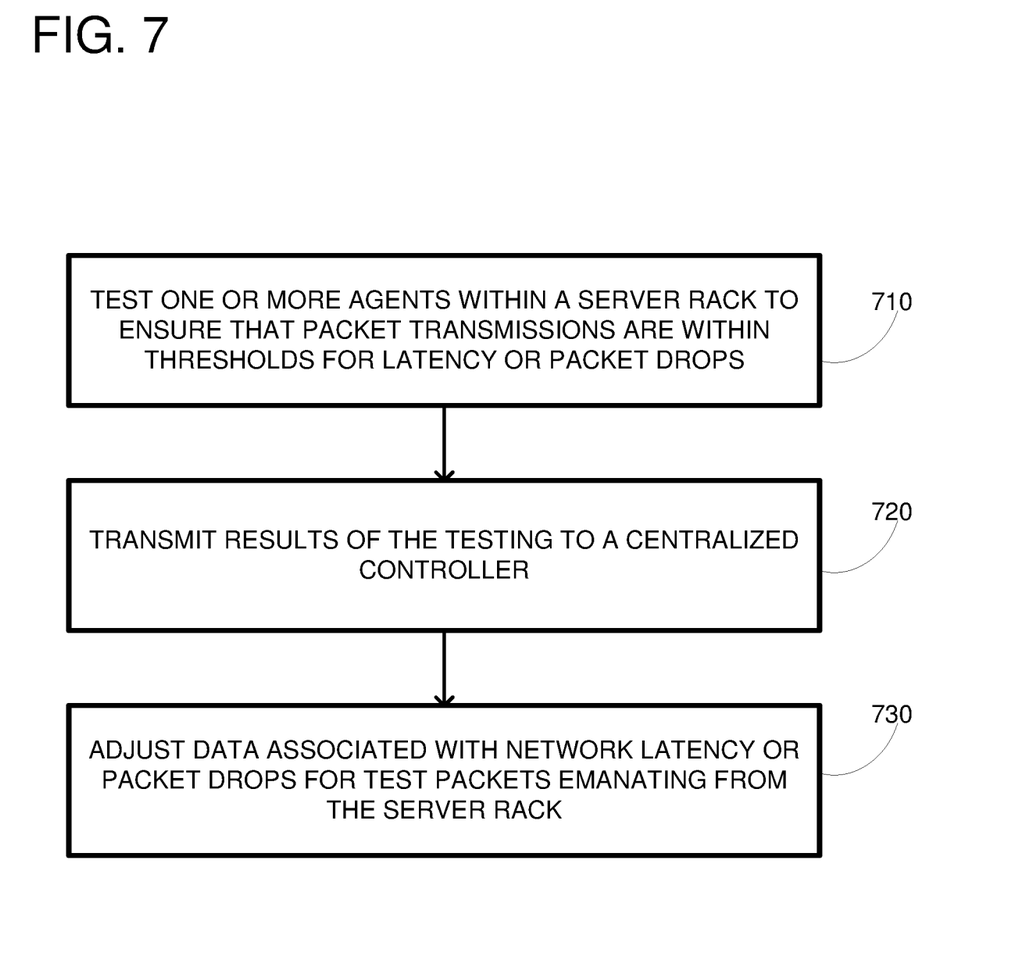
FIG. 7 is a flowchart according to another embodiment of a method for detecting noisy agents.

FIG. 7 is a flowchart according to another embodiment for testing a network. In process block 710, one or more agents are tested within a server rack to ensure that packet transmissions are within thresholds for latency or packet drops. For example, in FIG. 2, an intra-host probe 132 can be sent or an inter-host probe 232 can be sent to test one or more agents within the server rack 210. Testing agents within the rack 210 ensures that packets transmitted over the network 116 are testing the network properly. In process block 720, the self-test results are transmitted to a centralized controller. In some embodiments, the results are only sent to the centralized controller if the self-test failed. In other embodiments, the results are transmitted to the centralized controller regardless of failure. For example, in FIG. 2, if either probe 132 or 232 results in latency or dropped packets outside of predetermined thresholds, then the centralized controller 120 can be notified by the agents in the rack 210 that they are noisy. Finally, in process block 730, the centralized controller or the agent can adjust data associated with network latency or packet drops for test packets emanating from the server rack that failed. Thus, in FIG. 2, for test packets, such as probe 250 transmitted between data centers, the centralized controller 120 can adjust the latency or dropped packet data as the probe 250 was transmitted from rack 210 that has been identified as having latency issues or dropped packet issues.

Figure 8:
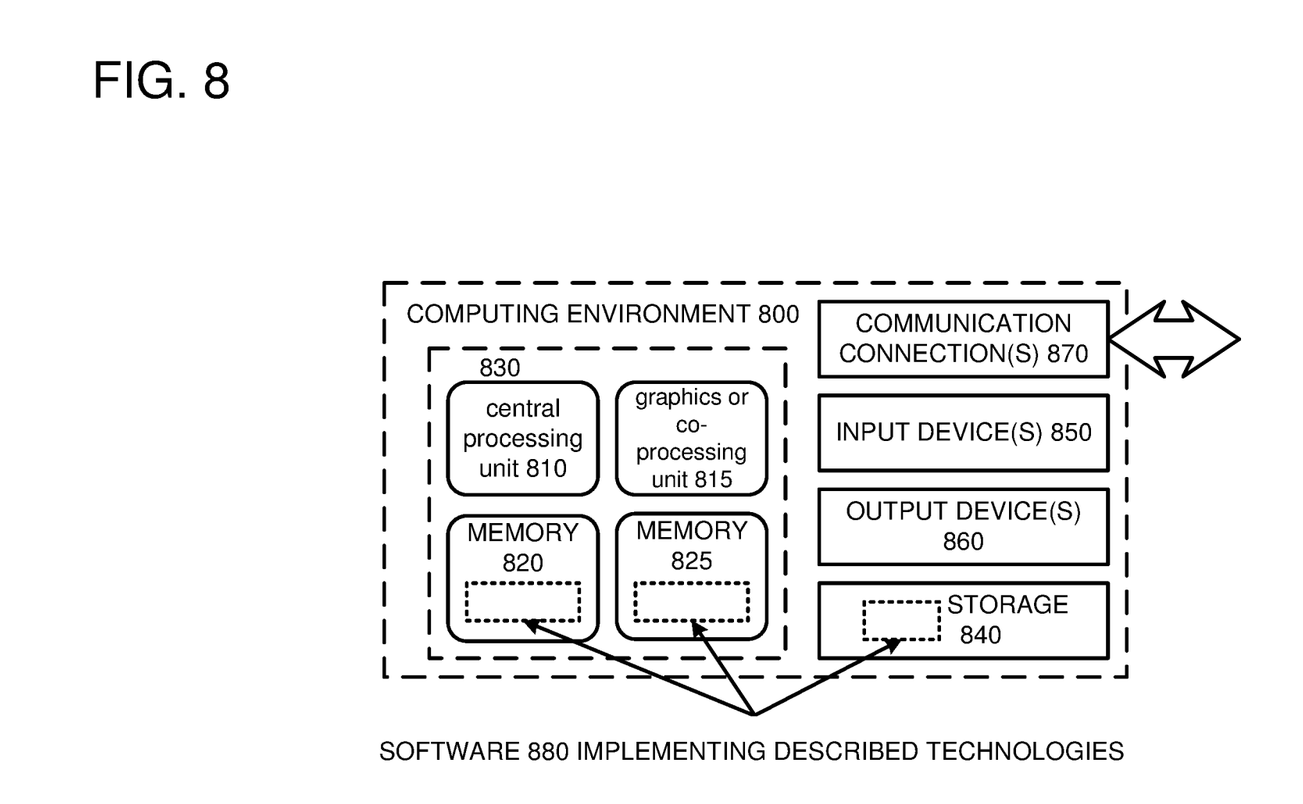
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. For example, the storage 840 can store instructions for implementing the centralized controller described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting anomalies in a network, the method comprising:
    transmitting a first test probe from an agent in a first server computer to a second server computer, wherein the first test probe passes through a network interconnecting the first and second server computers;
    transmitting a second test probe from the agent in a first server computer, wherein the agent is both a source and destination of the second test probe;
    determining an amount of time for the second test probe to be received by the agent;
    transmitting a message to a centralized controller that test probes from the first server computer are faulty; and
    adjusting data associated with the first test probe as originating from the agent,
    wherein the second test probe is transmitted to an egress buffer in a kernel of the first server computer and is received by an ingress buffer of the kernel, to determine whether the egress or ingress buffers are causing the amount of time to exceed a threshold.

2. The method of claim 1, wherein the adjusting of the data includes determining a latency for the first test probe and modifying the latency determination using the determined amount of time.

3. The method of claim 1, wherein the adjusting of the data includes ignoring dropped packets emanating from the first server computer or ignoring latency for packets emanating from the first server computer.

4. The method of claim 1, wherein the first server computer is in a first data center in a first geographic region and the second server computer is in a second data center in a second geographic region.

5. One or more computer-readable media comprising computer-executable instructions that, when executed, cause a computing system to perform a method comprising:
    monitoring a network using a centralized controller, the network coupling together multiple data centers;
    transmitting test probes within a rack of server computers in one of the multiple data centers to calculate a latency within the rack, wherein the transmitting of the test probes includes a server computer within the rack transmitting a test probe to itself in order to determine latency within the server computer;
    transmitting the latency to the centralized controller; and
    calculating latency within the network, wherein the latency within the rack is subtracted from the latency calculation within the network,
    wherein the transmitting of the test probe to itself includes transmitting the test probe from an agent within the server computer to an egress buffer within a kernel of the server computer and then to an ingress buffer of the kernel without passing the test probe through a network interface card.

6. The one or more computer-readable media of claim 5, wherein the method further includes:

testing dropped packets within the rack and wherein the centralized controller ignores dropped packets from the rack when a number of dropped packets tested within the rack exceeds a threshold.

7. The one or more computer-readable media of claim 5, wherein the test probes are not transmitted outside of the rack to test latency within the rack.

8. The one or more computer-readable media of claim 5, wherein the latency within the network includes latency of packets transmitted between data centers in different regions.

9. The method of claim 1, wherein the second test probe does not pass through a network interface card of the first server computer.

10. The method of claim 1, wherein the kernel of the first server computer comprises a hypervisor.

\* \* \* \* \*